United States Patent [19]

Schroeder

[11] Patent Number: 5,363,558
[45] Date of Patent: Nov. 15, 1994

[54] HAND HELD CORDLESS ELECTRIC SAW WITH ENDLESS BLADE IN "U"-FRAME

[76] Inventor: Ronald Schroeder, 4221 Vogel Rd., Milton, Wis. 53563

[21] Appl. No.: 151,866

[22] Filed: Nov. 15, 1993

[51] Int. Cl.$^5$ ............................................. B27B 13/00
[52] U.S. Cl. ......................................... 30/380; 30/500
[58] Field of Search ................. 30/380, 500, 122, 507; 83/818

[56] References Cited

U.S. PATENT DOCUMENTS

| | | | |
|---|---|---|---|
| 4,258,763 | 3/1981 | Figueredo et al. | 30/380 X |
| 4,413,414 | 11/1983 | Strzalka | 30/380 |
| 5,213,913 | 5/1993 | Anthony et al. | 30/500 X |

Primary Examiner—Douglas D. Watts
Attorney, Agent, or Firm—Howard M. Herriot

[57] ABSTRACT

Disclosed is a hand held, cordless electric, coping saw, which has a "U"-frame with a handle at one end of the "U". A battery and motor power the saw. The blade of the saw is endless and is round cylinder-type flexible blade trained in a generally rectangular loop about four wheels, one mounted in each corner of the "U", three of them idle wheels and one of them functioning as the drive wheel. The drive wheel is located at the handle end corner of the "U". At the other end of the "U", the frame has a "floating" corner piece housing one of the idler wheels and being spring biased away from the main part of the frame to provide saw blade tensioning.

1 Claim, 4 Drawing Sheets

HAND HELD CORDLESS ELECTRIC SAW WITH ENDLESS BLADE IN "U"-FRAME

BACKGROUND OF INVENTION

The installation of basetrim and crown molding by carpenters is usually done by cutting with a small "U"-frame hand saw, called a coping saw, to remove a portion from inside a mitered end of one piece. This permits a straight cut end of another piece (not mitered) to fit inside the miter end of the first piece, thus giving the appearance of a full mitered joint. The saw of this invention more easily makes this removal cut, and has many other useful and advantageous applications as well.

SUMMARY OF THE INVENTION

This invention provides a hand held cordless electric saw having a flexible endless blade driven in a generally rectangular loop about a "U"-shaped frame and across the opening of the "U". The frame has a handle extending from one end of the "U". The handle holds a battery power source to drive a small electric motor, e.g. one rated at about 9 or 10 amp., which drives the saw blade through a belt drive arrangement. Four saw wheels, one functioning as the driven wheel, carry the endless loop saw blade, which may be made of stranded steel wire. The four wheels are located one at each corner of the "U". The driven wheel is driven by a drive wheel on the motor shaft via a belt drive arrangement. The blade is of generally circular cross section, in the order of from one-sixteenth to one-eighth of an inch in diameter, with a cutting or abrasive surface. The blade is driven in continuous direction which may be either forward or reverse direction, by a reversible motor controlled by a trigger switch in the handle area. The length of the blade is about from 24 to 36 inches. The cutting length of blade exposed at the mouth of the "U" is about from five to seven inches. The blade is flexible and has a bending radius of about one-half inch. The blade tension may be kept by a spring and frame gap tensioning arrangement near the open end of the frame furthest from the handle. The blade is easily removed and replaced with the same or another blade. On one side of the saw frame, five cover pieces are removable to enable changing blades, cleaning parts, changing battery, etc.

DETAILED DESCRIPTION

Figure 1:
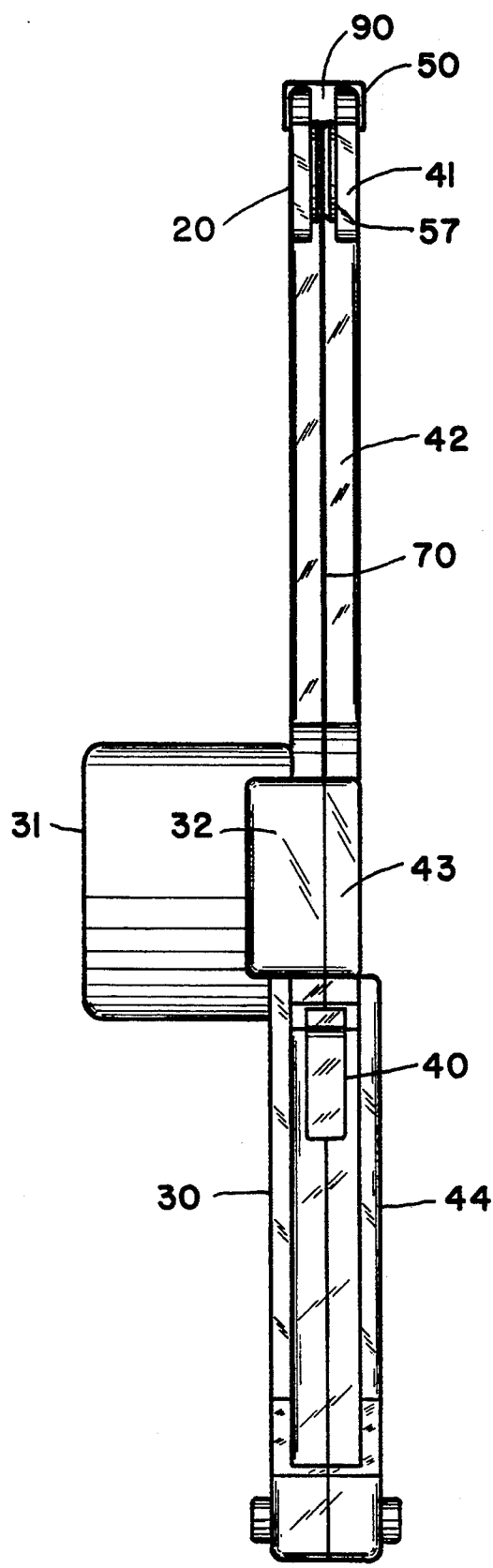
FIG. 1 is a front elevation view of a saw of my invention.
Figure 2:
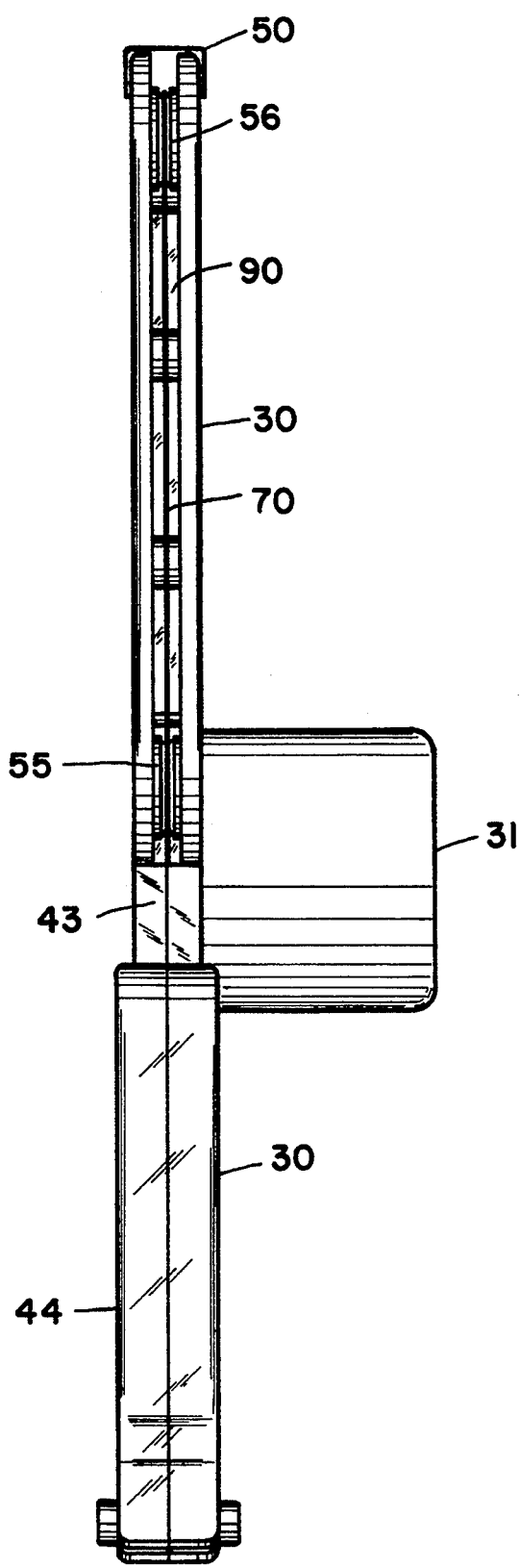
FIG. 2 is a rear elevation view thereof.
Figure 3:
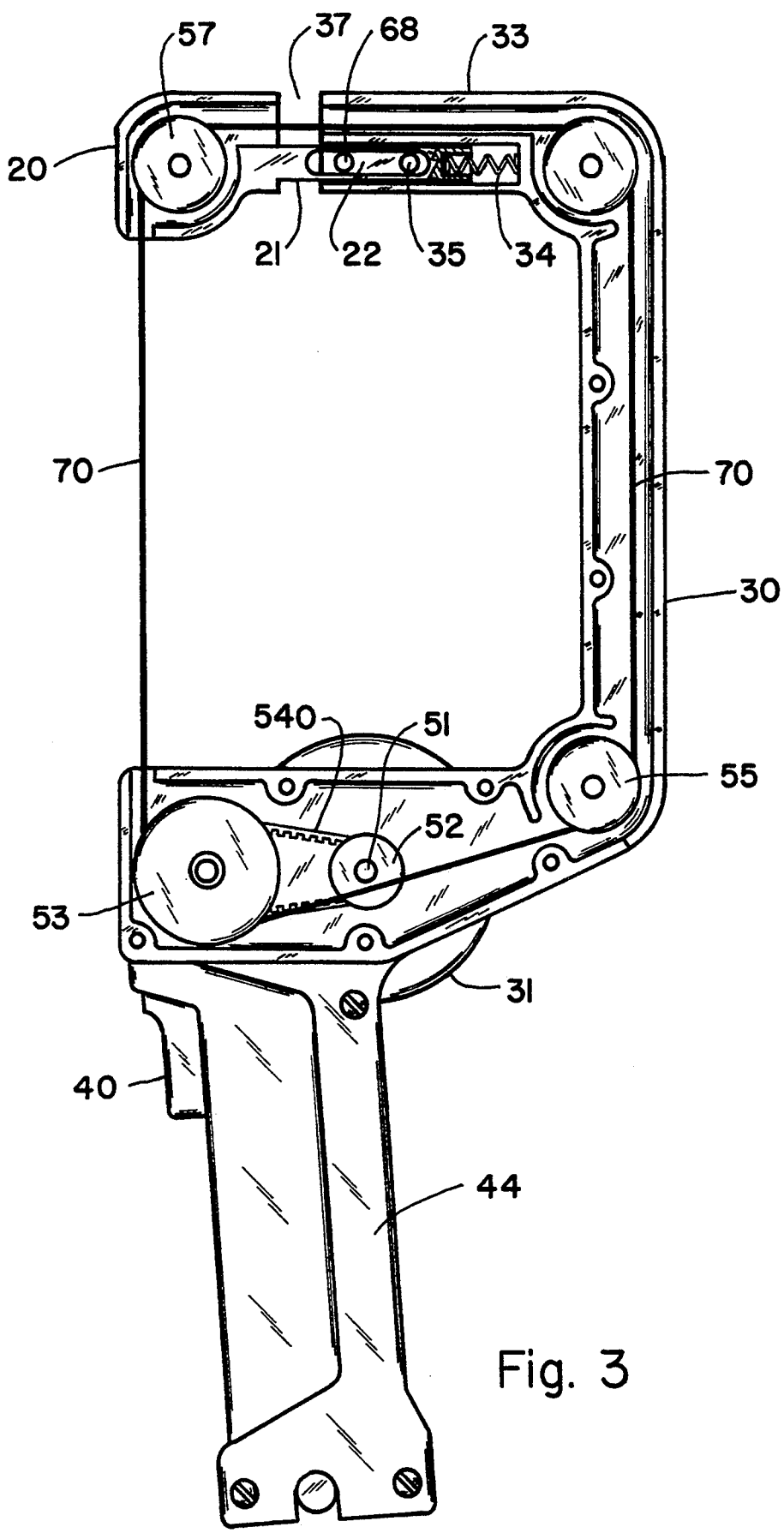
FIG. 3 is right side elevation view thereof, with three of the covers removed from the saw frame.

Referring to the drawing, the saw has a body comprising a main base piece 30 and a "floating" corner base piece 20. Base piece 30 has a "U"-frame portion and a handle portion, as well as a motor portion. The handle portion thereof houses the battery (not shown). The motor portion 31 includes a motor having a shaft 51 and belt drive wheel 52. A portion 32 of base piece 30 houses the belt driven wheel 54. The bight leg portion of the "U"-frame houses two saw blade idler wheels 55 and 56, one at each end of the bight leg as shown in FIG. 3. Idler wheel 57 is housed in the "floating" corner base piece 20.

Figure 7:
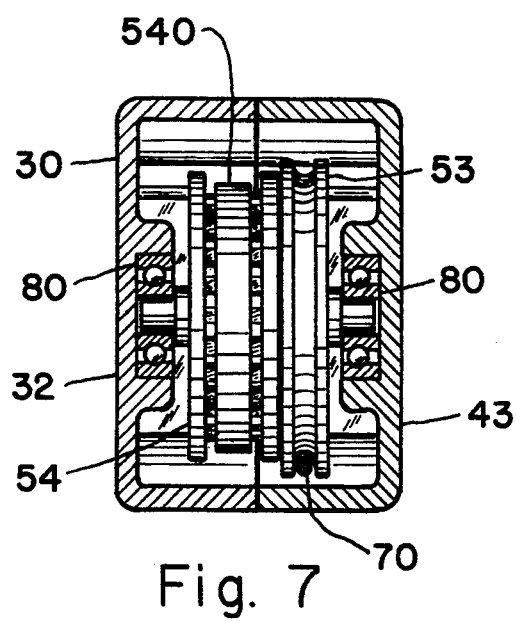
FIG. 7 is a sectional view, taken on lines 7—7 in FIG. 4.
Figure 8:
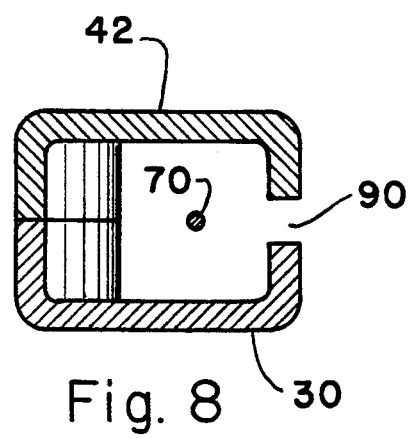
FIG. 8 is a sectional view taken on lines 8—8 of FIG. 4.

The saw blade 70 is driven by drive wheel 53 which is on the same shaft as belt driven wheel 54 housed in portion 32 of base 30. The shaft for wheels 53 and 54 are mounted in ball bearings 80, as shown in FIG. 7. Belt 540 connects driven wheel 54 with drive wheel 52, as best seen in FIG. 3 and 7. A cover piece 43 covers the belt drive arrangement.

Figure 4:
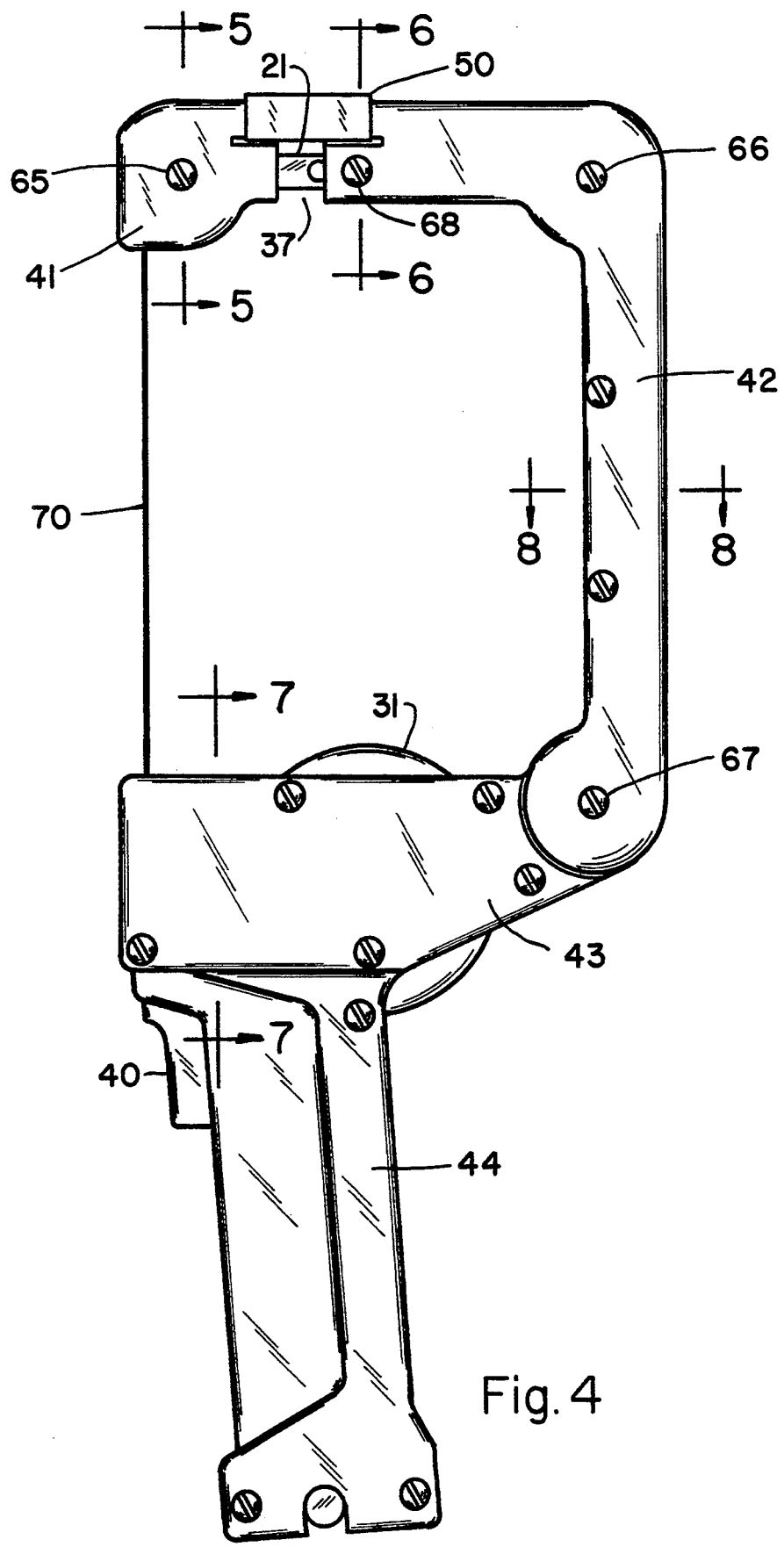
FIG. 4 is a right side elevation view of the saw with all five covers in place on the saw frame.
Figure 6:
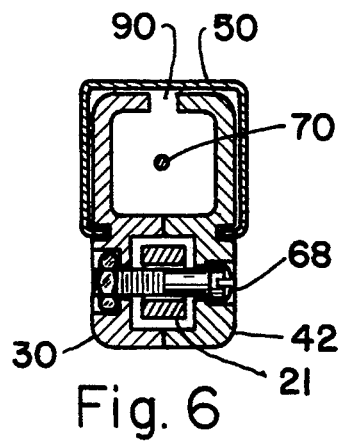
FIG. 6 is a sectional view, taken on lines 6—6 in FIG. 4.

Blade tension adjustment is provided by spring 34 which urges "floating" corner piece 20 apart from the top leg 33 of main frame piece 30. Referring to FIG. 3, "floating" corner piece 20 has an extension 21 having a groove or slot 22 therein which engages a pin 35 in the top leg 33 of main piece 30. A gap 37 separates top leg 33 from the main part of floating corner piece 20, and the gap dimension varies to tension the saw blade when the load placed on saw blade varies. A bolt 68 passes through a hole near the end of leg 33 of main piece 30, and acts as another pin passing through slot 22, and also serves to help hold cover piece 42 in place, as shown in FIGS. 4 and 6. The top of gap 37 is covered by a removable snap in clip which snaps thereacross into grooves provided in the saw body and cover structures.

Figure 5:
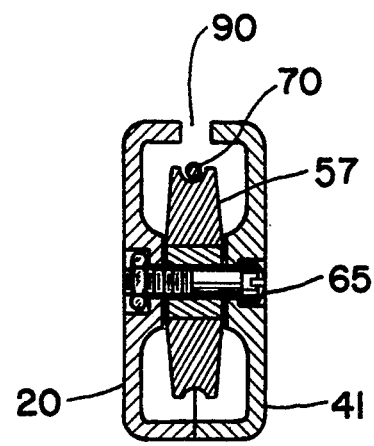
FIG. 5 is a sectional view, taken on lines 5—5 in FIG. 4.

Cover pieces 41, 42, 43 and 44 attach with bolts as shown in the drawing. Cover 41 covers idle wheel 57 in the floating corner piece 20, with bolt 65 holding cover 41 in place and acting as an axle for wheel 57, as is shown in FIG. 5. Cover 42 covers top leg 33, as well as idle wheels 55 and 56, and also the "U"-frame bight portion of base 30. Bolt 66 helps connect cover 42, and also acts as an axle for wheel 56. Bolt 67 helps connect cover 42, and also acts as an axle for wheel 55. Cover 43 covers the belt drive arrangement, as seen by reference to FIGS. 3, 4 and 7. Cover 44 covers the handle extension portion of main base 30 and the battery arrangement housed therein. A trigger switch 40 is located in the upper part of the handle portion near the motor and drive arrangement. The switch may turn the power on and off, and reverse the motor to reverse the direction of the drive, so that the saw blade may be driven in either direction around the "U" frame and across the opening of the "U"-frame.

Motor portion 31 extends from the frame in a direction normal to the plan of the "U"-frame and normal to the long axis of the handle, which axis lies in the same plane as the saw blade plane.

With the covers 41 and 42 in place, held to the saw body by the bolts, as shown, they leave a gap 90 between the saw body and the covers, as best seen in FIGS. 1, 2, 5, 6 and 8. One may easily remove and replace a saw blade by merely removing snap clip 50 and removing cover piece 43, taking the blade from the blade wheels, and pulling the blade out through gap 90 leaving covers 41, 42 and 44 in place.

All of the cover pieces 41, 42, 43 and 44 are on the same side of the saw body, which is advantageous in assembling the saw, in changing the battery and/or saw blade, and in cleaning or oiling parts.

The blade 70 is a round cylinder-type blade which may be a solid wire or a twisted wire structure of steel or other suitable material, and having abrasive or cutting quality, and being of sufficient flexibility to be driven in a generally rectangular loop about the four wheels 53, 55, 56 and 57.

I claim:

1. A hand held, cordless, battery powered, electric motor driven endless blade saw comprising:

a "U"-frame having four wheels, one in each corner of the "U" frame and lying in a common plane;

an endless flexible blade trained about said wheels in a generally rectangular loop and extending across the opening of the "U";

one of said wheels being the blade drive wheel for said blade, and the others being idler wheels;

a motor connected to said frame and being in driving engagement with said drive wheel;

a handle extending from said frame;

a battery disposed within said handle and electrically connected to said motor through a switch; (The invention of claim 1) wherein:

said handle extends from said frame at one end of said frame;

said frame near the other end thereof having a corner piece slidably engaging the main part of the frame and being resiliently biased apart therefrom to provide saw blade tensioning;

said motor extends from said frame near the handle end of the frame in a direction substantially normal to the plane of the saw-blade and "U" frame;

said driving engagement between said motor and said blade drive wheel provided by a belt drive arrangement comprising a belt drive wheel driven by the motor, a belt driven wheel on the same axle as the blade drive wheel, and a belt connecting said belt drive wheel and said belt driven wheel;

a corner cover piece covering said corner piece;

a main cover piece covering said main piece;

a driving engagement cover piece covering said belt drive arrangement; and a handle cover piece covering said handle.

* * * * *